(12) United States Patent
Kozlowski et al.

(10) Patent No.: US 8,414,405 B2
(45) Date of Patent: Apr. 9, 2013

(54) FIXED CENTER CONSTANT VELOCITY JOINT WITH DIFFERENT FUNNEL OFFSETS

(75) Inventors: Keith A. Kozlowski, Saginaw, MI (US); Eduardo Mondragon, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 826 days.

(21) Appl. No.: 11/950,047

(22) Filed: Dec. 4, 2007

(65) Prior Publication Data
US 2009/0143150 A1    Jun. 4, 2009

(51) Int. Cl.
*F16D 3/224*    (2011.01)
(52) U.S. Cl. .................... 464/145; 464/906
(58) Field of Classification Search ............. 464/140, 464/144, 145, 906
See application file for complete search history.

(56) References Cited

U.S. PATENT DOCUMENTS

| 2,046,584 | A | * | 7/1936 | Rzeppa | 464/145 |
| 2,325,460 | A | | 11/1940 | Amberg | |
| 3,475,924 | A | | 11/1969 | Aucktor | |
| 6,848,999 | B2 | | 2/2005 | Weckerling et al. | |
| 2005/0090317 | A1 | * | 4/2005 | Hassenrik et al. | 464/145 |

* cited by examiner

*Primary Examiner* — Gregory Binda
*Assistant Examiner* — Jay R Ripley
(74) *Attorney, Agent, or Firm* — Cantor Colburn LLP

(57) ABSTRACT

A fixed center constant velocity joint includes a first group of funnels and a second group of funnels arranged radially about a longitudinal axis in alternating relationship. The first group of funnels diverges in a first direction and the second group of funnels diverges in a second direction opposite the first direction along the longitudinal axis. The first group of funnels defines a first diverging width increasing in value along the longitudinal axis and the second group of funnels defines a second diverging width increasing in value at a different rate than the first diverging width to bias the joint in one of the first direction and the second direction.

16 Claims, 3 Drawing Sheets

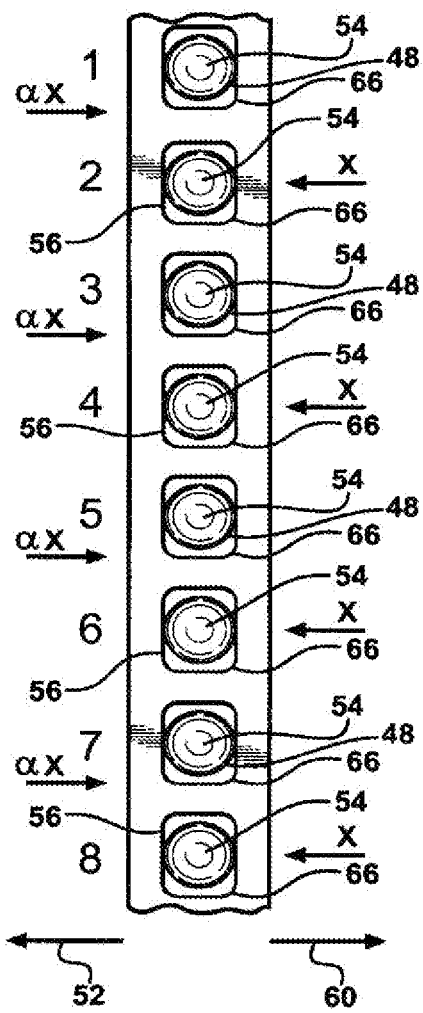
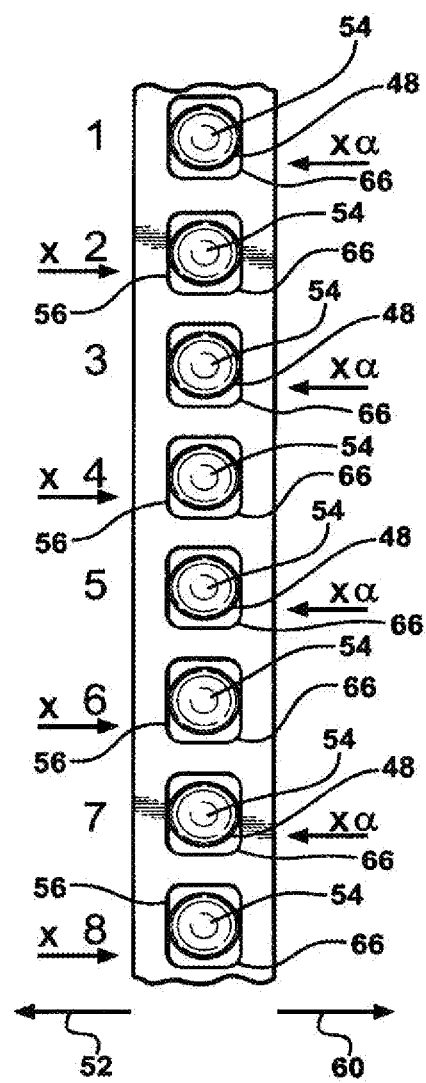
FIG - 4   FIG - 5

FIXED CENTER CONSTANT VELOCITY JOINT WITH DIFFERENT FUNNEL OFFSETS

BACKGROUND OF THE INVENTION

1. Field of the Invention

The subject invention relates to a constant velocity joint, and more specifically to a fixed center constant velocity joint.

2. Description of the Prior Art

Fixed center constant velocity joints typically comprise an outer member, which defines a spherical interior and a plurality of outer member ball tracks within the interior. The interior and the plurality of outer member ball tracks extend along a longitudinal axis. The plurality of outer member ball tracks includes a first group of outer member ball tracks and a second group of outer member ball tracks. An inner member is disposed within the interior, and defines a spherical outer surface and a plurality of inner member ball tracks extending along the longitudinal axis. The plurality of inner member ball tracks includes a first group of inner member ball tracks and a second group of inner member ball tracks. The first group of inner member ball tracks opposes the first group of outer member ball tracks to define a first group of funnels. The second group of inner member ball tracks opposes the second group of outer member ball tracks to define a second group of funnels. The constant velocity joint further comprises a plurality of drive balls, with one of the drive balls disposed within each of the first group of funnels and within each of the second group of funnels. A cage is disposed between the outer member and the inner member, and defines a plurality of windows. One of the drive balls is disposed within each of the windows.

Typically, the first group of funnels and the second group of funnels include a diverging width, which urges the drive ball contained within each of the funnels in the direction of the diverging funnel. Preferably, the diverging widths of the first group of funnels and the second group of funnels are equal, with the first group of funnels and the second group of funnels arranged in opposing directions to theoretically place the cage in a neutral non-biased state. U.S. Pat. No. 6,848,999 to Weckerling et al. discloses a fixed center constant velocity joint in which the first group of funnels diverges at the same rate along the longitudinal axis in an opposite direction relative to the second group of funnels, with the first group of funnels and the second group of funnels spaced radially about the longitudinal axis in an alternating relationship.

The diverging configuration of the funnels urges the drive balls in the direction in which the funnel diverges to steer the cage, i.e., pre-load the cage to de-lash the joint and keep the cage from rattling. However, because the first group of funnels and the second group of funnels divert at the same rate, the first group of funnels and the second group of funnels provide an equal force to bias the cage, i.e., the cage is in a neutral state and is free to move within the interior creating undesirable vibration and noise.

SUMMARY OF THE INVENTION AND ADVANTAGES

The subject invention provides a constant velocity joint. The constant velocity joint comprises an outer member. The outer member includes an attachment end for attachment to a drive shaft, and defines an interior and a plurality of outer member ball tracks within the interior. The plurality of outer member ball tracks extends along a longitudinal axis. The plurality of outer member ball tracks includes a first group of outer member ball tracks and a second group of outer member ball tracks. An inner member is disposed within the interior, and defines a plurality of inner member ball tracks. The plurality of inner member ball tracks extends along the longitudinal axis. The plurality of inner member ball tracks includes a first group of inner member ball tracks and a second group of inner member ball tracks. The first group of inner member ball tracks opposes the first group of outer member ball tracks to define a first group of funnels. The second group of inner member ball tracks opposes the second group of outer member ball tracks to define a second group of funnels. The constant velocity joint further comprises a plurality of drive balls. One of the plurality of drive balls is disposed within each of the first group of funnels and within each of the second group of funnels. A cage is disposed between the outer member and the inner member. The cage defines a plurality of windows, with one of the plurality of drive balls disposed within each of the plurality of windows. The first group of inner member ball tracks and the first group of outer member ball tracks of the first group of funnels are spaced from each other in non-parallel relationship to define a first diverging width. The first diverging width diverges toward the attachment end in a first direction along the longitudinal axis to urge the plurality of drive balls disposed within the first group of funnels in the first direction. The second group of inner member ball tracks and the second group of outer member ball tracks of the second group of funnels are spaced from each other in non-parallel relationship to define a second diverging width. The second diverging width diverges away from the attachment end in a second direction along the longitudinal axis to urge the plurality of drive balls disposed within the second group of funnels in the second direction. The first diverging width increases in value along the longitudinal axis in the first direction at a first rate of divergence. The second diverging width increases in value along the longitudinal axis in the second direction at a second rate of divergence. The first rate of divergence is different from the second rate of divergence to bias the cage in one of the first direction and the second direction.

Accordingly, the rate of divergence of the first group of funnels and the second group of funnels relates to a force in which the first group of funnels directs the cage in the first direction and the second group of funnels directs the cage in the second direction. Because the first rate of divergence is different from the second rate of divergence, the first group of funnels applies a force to the cage that is different from the second group of funnels. Accordingly, the cage is constantly pre-loaded in one of the first direction or the second direction to limit movement of the cage within the interior of the outer member to reduce undesirable noise and vibration.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a force diagram indicating the forces acting on individual drive balls of the constant velocity joint; and FIG. 5 is an alternative embodiment of the constant velocity joint indicating the forces acting on individual drive balls of the constant velocity joint.

DETAILED DESCRIPTION OF THE INVENTION

Referring to the Figures, wherein like numerals indicate corresponding parts throughout the several views, a constant velocity joint is shown generally at 20. The constant velocity joint 20 rotatably couples a drive shaft 22 to a driven shaft 24. The constant velocity joint 20 permits relative rotation between the drive shaft 22 and the driven shaft 24 when the drive shaft 22 and the driven shaft 24 are angled relative to each other as is well known in the art.

Figure 1:
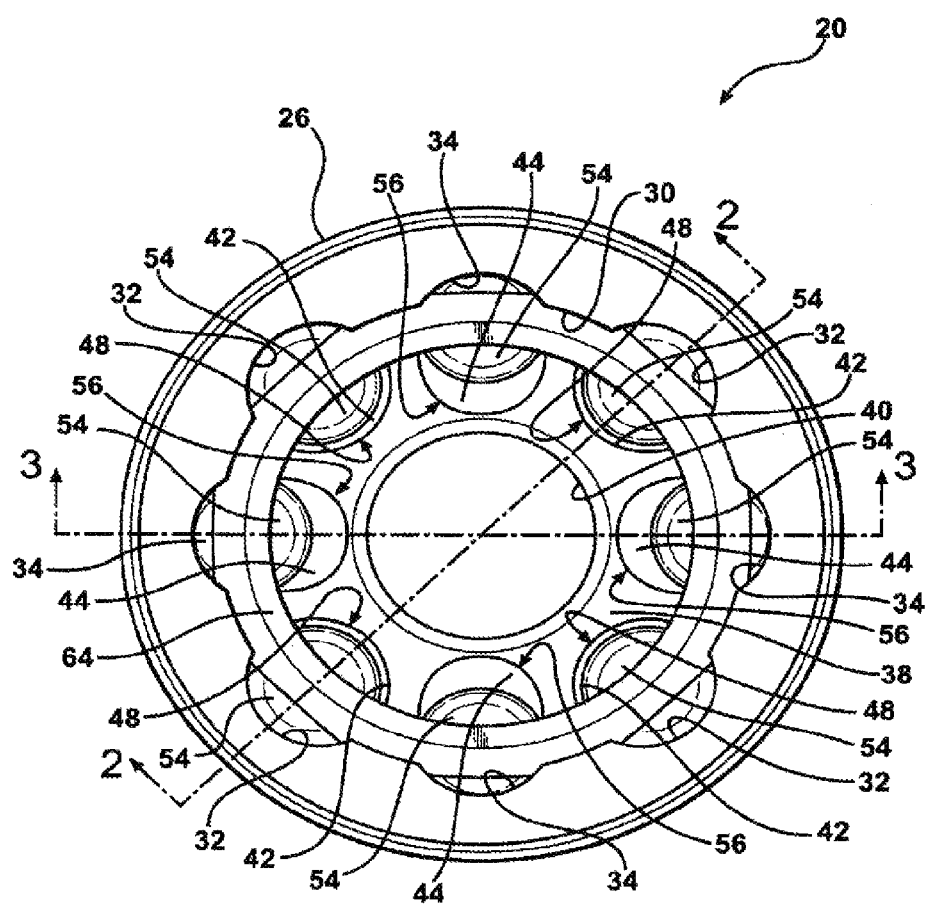
FIG. 1 is an end view of a constant velocity joint.
Figure 2:
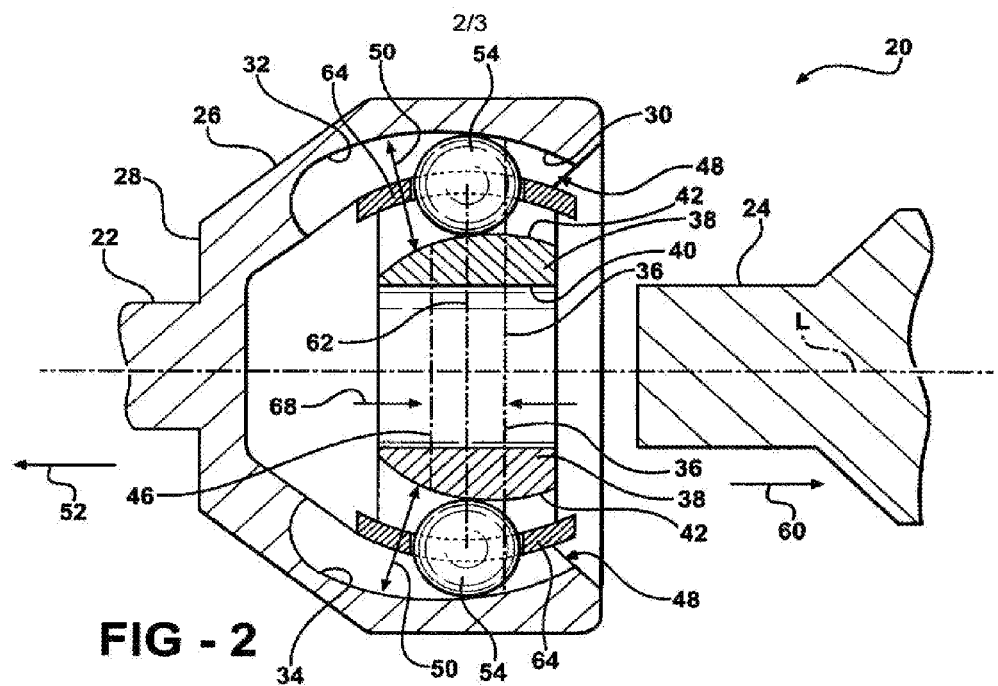
FIG. 2 is a cross section view along cut line 2-2 shown in FIG. 1.
Figure 3:
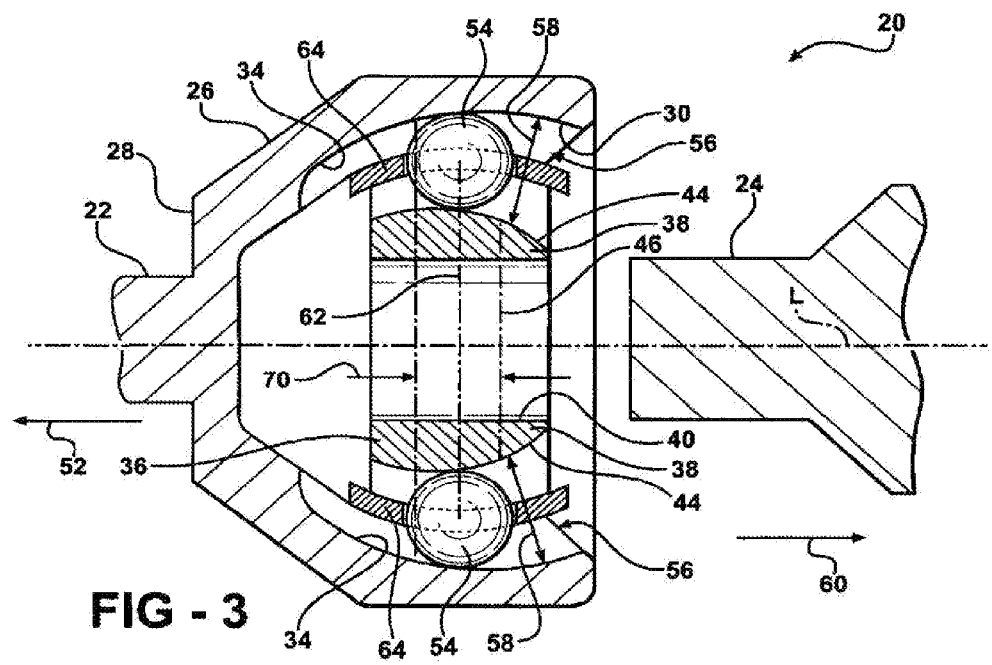
FIG. 3 is a cross section view along cut line 3-3 shown in FIG. 1.

Referring to FIGS. 1 through 3 and as best shown in FIGS. 2 and 3, the constant velocity joint 20 includes an outer member 26. The outer member 26 includes an attachment end 28 for coupling the outer member 26 to the drive shaft 22. Typically, the drive shaft 22 is integrally formed with the outer member 26. However, it should be appreciated that the drive shaft 22 may be fixedly connected to the attachment end 28 of the outer member 26 by any suitable method.

The outer member 26 defines an interior 30 and a plurality of outer member ball tracks 32, 34 within the interior 30. The interior 30 and the plurality of outer member ball tracks 32, 34 extend along a longitudinal axis L. The plurality of outer member ball tracks 32, 34 includes a first group of outer member ball tracks 32 and a second group of outer member ball tracks 34. Preferably, the first group of outer member ball tracks 32 and the second group of outer member ball tracks 34 include a longitudinally arcuate profile extending along the longitudinal axis L, and a semi-circular cross section extending transverse to the longitudinal axis L. The arcuate profile of each of the first group of outer member ball tracks 32 and the second group of outer member ball tracks 34 defines an outer race center 36 of curvature-positioned axially along the longitudinal axis L. However, it should be appreciated that the first group of outer member ball tracks 32 and the second group of outer member ball tracks 34 may include a shape other than the arcuate profile shown and described herein.

An inner member 38 is disposed within the interior 30 of the outer member 26. The inner member 38 defines an aperture 40 for receiving the driven shaft 24 therein, which extends away from the attachment end 28. The driven shaft 24 is coupled to the inner member 38 for rotation with the inner member 38. For example, the aperture 40 and the driven shaft 24 may include complimentary splines for engaging each other. It should be appreciated, however, that the driven shaft 24 may be coupled to the inner member 38 in some other suitable manner not described herein.

The inner member 38 defines a plurality of inner member ball tracks 42, 44, which extend along the longitudinal axis L. The plurality of inner member ball tracks 42, 44 includes a first group of inner member ball tracks 42 and a second group of inner member ball tracks 44. Preferably, the first group of inner member ball tracks 42 and the second group of inner member ball tracks 44 include an arcuate profile extending along the longitudinal axis L, and a semi-circular cross section extending transverse to the longitudinal axis L. The arcuate profile of each of the first group of inner member ball tracks 42 and the second group of inner member ball tracks 44 define an inner race center 46 positioned axially along the longitudinal axis L. However, it should be appreciated that the first group of inner member ball tracks 42 and the second group of inner member ball tracks 44 may include a shape other than the arcuate profile shown and described herein.

Referring to FIG. 2, the first group of inner member ball tracks 42 opposes the first group of outer member ball tracks 32 to define a first group of funnels 48. The first group of inner member ball tracks 42 and the first group of outer member ball tracks 32 of the first group of funnels 48 are spaced from each other in non-parallel relationship relative to each other, and cooperate to define a first diverging width 50 between the first group of inner member ball tracks 42 and the first group of outer member ball tracks 32 that diverges toward the attachment end 28 in a first direction 52 along the longitudinal axis L to urge the drive balls 54 disposed within the first group of funnels 48 in the first direction 52. Preferably, the arcuate profile of the first group of inner member ball tracks 42 and the first group of outer member ball tracks 32 cooperate such that the first group of funnels 48 includes an arcuate profile along the longitudinal axis L.

Referring to FIG. 3, the second group of inner member ball tracks 44 opposes the second group of outer member ball tracks 34 to define a second group of funnels 56. The second group of inner member ball tracks 44 and the second group of outer member ball tracks 34 of the second group of funnels 56 are spaced from each other in non-parallel relationship to define a second diverging width 58 between the second group of inner member ball tracks 44 and the second group of outer member ball tracks 34 that diverges away from the attachment end 28 in a second direction 60 along the longitudinal axis L to urge the drive balls 54 disposed within the second group of funnels 56 in the second direction 60. Preferably, the arcuate profile of the second group of inner member ball tracks 44 and the second group of outer member ball tracks 34 cooperate such that the second group of funnels 56 includes an arcuate profile along the longitudinal axis L.

Referring back to FIGS. 1 through 3, the constant velocity joint 20 further comprises a plurality of drive balls 54. The plurality of drive balls 54 includes a spherical shape and transmits torque between the outer member 26 and the inner member 38. One of the plurality of drive balls 54 is disposed within each of the first group of funnels 48 and within each of the second group of funnels 56. Each of the drive balls 54 include a ball center 62 axially positioned along the longitudinal axis L.

A cage 64 is disposed between the outer member 26 and the inner member 38. The cage 64 defines a plurality of windows 66 with one of the plurality of drive balls 54 disposed within each of the plurality of windows 66. The cage 64 maintains the drive balls 54 in a plane as the constant velocity joint 20 articulates to permit relative angular movement between the drive shaft 22 and the drive shaft 22.

As best shown in FIG. 1, the first group of funnels 48 and the second group of funnels 56 are arranged radially about the longitudinal axis L in alternating relationship relative to each other. The first group of funnels 48 and the second group of funnels 56 are equally spaced from each other radially about the longitudinal axis L. Accordingly, there are an equal number of funnels in the first group of funnels 48 and in the second group of funnels 56. Preferably, the first group of funnels 48 includes a group having four funnels and the second group of funnels 56 includes a group having four funnels. However, it should be appreciated that the number of funnels in the first group of funnels 48 and the number of funnels in the second group of funnels 56 may vary from that shown or described herein.

A shown in FIG. 2, the first diverging width 50 increases in value along the longitudinal axis L in the first direction 52 at a first rate of divergence. As shown in FIG. 3, the second diverging width 58 increases in value along the longitudinal axis L in the second direction 60 at a second rate of divergence, which is different from the first rate of divergence. As represented in FIGS. 4 and 5, the difference between the first rate of divergence and the second rate of divergence results in a net force applied to the drive balls 54 in either the first direction 52 or the second direction 60 to steer the cage 64, i.e., to bias the cage 64 in one of the first direction 52 and the second direction 60.

The direction the drive balls 54 are urged by the funnels 48, 56 is dependent upon the direction in which the funnels 48, 56 are diverging. For example, the first group of funnels 48 diverges toward the attachment end 28 in the first direction 52, and therefore urges the drive balls 54 within the first group of funnels 48 in the first direction 52. In other words, as the first group of funnels 48 expands with a decrease in distance relative to the attachment end 28, the drive balls 54 are urged in the first direction 52 toward the attachment end 28. Likewise, the second group of funnels 56 diverges away from the attachment end 28 in the second direction 60 and therefore urges the drive balls 54 within the second group of funnels 56 in the second direction 60. In other words, as the second group of funnels 56 expands with an increase in distance relative to the attachment end 28, then the drive balls 54 are urged in a second direction 60 away from the attachment end 28.

If the first group of funnels 48 and the second group of funnels 56 include the arcuate profile along the longitudinal axis L, then the first rate of divergence and the second rate of divergence are variable along the longitudinal axis L because of the continuously changing slope of the arcuate profile relative to the longitudinal axis L. Accordingly, the arcuate profile of the first group of outer member ball tracks 32 is different from the arcuate profile of the second group of outer member ball tracks 34. So that the first diverging width 50 differs from the second diverging width 58. Additionally, the arcuate profile of the first group of inner member ball tracks 42 is different from the arcuate profile of the second group of inner member ball tracks 44 so that the fist diverging width differs from the second diverging width 58. However, it should be appreciated that if the first group of funnels 48 and the second group of funnels 56 do not include the arcuate profile, then the first rate of divergence and the second rate of divergence is not variable, but fixed.

The first rate of divergence may be greater than the second rate of divergence to bias the cage 64 in the first direction 52, or alternatively, the second rate of divergence may be greater than the first rate of divergence to bias the cage 64 in the second direction 60. As shown in FIG. 4, where the net force applied to the drive balls is represented by X and α represents a pre-determined percentage, the first rate of divergence is greater than the second rate of divergence, with the second rate of divergence being preferably at least eighty percent (i.e, α is equal to 0.80%) of the first rate of divergence, and more preferably the second rate of divergence is at least ninety five percent (i.e, α is equal to 0.95%) of the first rate of divergence. As shown in FIG. 5, where the net force applied to the drive balls is represented by X and α represents a pre-determined percentage, the second rate of divergence is greater than the first rate of divergence, with the first rate of divergence being preferably at least eighty percent (i.e, α is equal to 0.80%) of the second rate of divergence, and more preferably the first rate of divergence is at least ninety five percent (i.e, a is equal to 0.95%) of the second rate of divergence.

Referring back to FIGS. 2 and 3, one way to control the direction in which the first group of funnels 48 and the second group of funnels 56 diverge is the relative placement of the inner race centers 46 and the outer race centers 36 along the longitudinal axis L. If the outer race center 36 is positioned along the longitudinal axis L farther from the attachment end 28 than the inner race center 46, with the ball center 62 positioned therebetween, the offset between the outer race center 36 and the inner race center 46 opens the diverging funnel toward the attachment end 28 and will urge the drive ball 54 in the first direction 52 toward the attachment end 28. Alternatively, if the outer race center 36 is positioned along the longitudinal axis L nearer the attachment end 28 than the inner race center 46, with the ball center 62 disposed therebetween, the offset between the outer race center 36 and the inner race center 46 opens the diverging funnel away from the attachment end 28 and will urge the drive ball 54 in the second direction 60 away from the attachment end 28.

As described above, the arcuate profile of each of the first group of inner member ball tracks 42 and the second group of inner member ball tracks 44 defines an inner race center 46 along the longitudinal axis L. The arcuate profile of each of the first group of outer member ball tracks 32 and the second group of outer member ball tracks 34 defines an outer race center 36 along the longitudinal axis L. The inner race centers 46 of the first group of inner member ball tracks 42 are spaced from the outer race centers 36 of the first group of outer member ball tracks 32 along the longitudinal axis L a first distance 68 to define a first offset, and the inner race centers 46 of the second group of inner member ball tracks 44 are spaced from the outer race centers 36 of the second group of outer member ball tracks 34 along the longitudinal axis L a second distance 70 different from the first distance 68 to define a second offset. Accordingly, the inner race centers 46 of the first group of inner member ball tracks 42 is farther from the attachment end 28 than the outer race centers 36 of the first group of outer member ball tracks 32 and the inner race centers 46 of the second group of inner member ball tracks 44 is nearer the attachment end 28 than the outer race centers 36 of the second group of outer member ball tracks 34.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A constant velocity joint comprising:
an outer member having an attachment end for attachment to a drive shaft and defining an interior and a plurality of outer member ball tracks within said interior extending along a longitudinal axis with said plurality of outer member ball tracks including a first group of outer member ball tracks and a second group of outer member ball tracks;
an inner member disposed within said interior and defining a plurality of inner member ball tracks extending along said longitudinal axis with said plurality of inner member ball tracks including a first group of inner member ball tracks and a second group of inner member ball tracks;
said first group of inner member ball tracks opposing said first group of outer member ball tracks to define a first group of funnels and said second group of inner member ball tracks opposing said second group of outer member ball tracks to define a second group of funnels;
a plurality of drive balls with one of said plurality of drive balls disposed within each of said first group of funnels and within each of said second group of funnels; and
a cage disposed between said outer member and said inner member and defining a plurality of windows, each of said windows having a size, a shape and a spacing from adjacent windows, with one of said plurality of drive balls disposed within each of said plurality of windows, each of the plurality of windows having substantially the same size and shape and spacing from the adjacent windows;

said first group of inner member ball tracks and said first group of outer member ball tracks of said first group of funnels spaced from each other in non-parallel relationship to define a first diverging width that diverges toward said attachment end in a first direction along said longitudinal axis to urge said plurality of drive balls disposed within said first group of funnels in said first direction;

said second group of inner member ball tracks and said second group of outer member ball tracks of said second group of funnels spaced from each other in non-parallel relationship to define a second diverging width that diverges away from said attachment end in a second direction along said longitudinal axis to urge said plurality of drive balls disposed within said second group of funnels in said second direction;

said first diverging width increasing in value along said longitudinal axis in said first direction at a first rate of divergence providing a first force against said cage in said first direction, and said second diverging width increasing in value along said longitudinal axis in said second direction at a second rate of divergence different from said first rate of divergence providing a second force against said cage in said second direction opposite said first direction, a difference between said first force and said second force biasing said cage in one of said first direction and said second direction.

2. A joint as set forth in claim 1 wherein said first group of funnels and said second group of funnels are arranged radially about said longitudinal axis in alternating relationship relative to each other.

3. A joint as set forth in claim 2 wherein each of said first group of inner member ball tracks and said first group of outer member ball tracks include an arcuate profile along said longitudinal axis such that said first group of funnels includes an arcuate profile along said longitudinal axis and wherein each of said second group of inner member ball tracks and said second group of outer member ball tracks include an arcuate profile along said longitudinal axis such that said second group of funnels includes an arcuate profile along said longitudinal axis.

4. A joint as set forth in claim 3 wherein said first rate of divergence and said second rate of divergence are variable along said longitudinal axis.

5. A joint as set forth in claim 3 wherein said arcuate profile of said first group of outer member ball tracks is different from said arcuate profile of said second group of outer member ball tracks.

6. A joint as set forth in claim 5 wherein said arcuate profile of said first group of inner member ball tracks is different from said arcuate profile of said second group of inner member ball tracks.

7. A joint as set forth in claim 2 wherein said first rate of divergence is greater than said second rate of divergence to bias said cage in said first direction.

8. A joint as set forth in claim 7 wherein said second rate of divergence is at least eighty percent (0.80%) of said first rate of divergence.

9. A joint as set forth in claim 8 wherein said second rate of divergence is at least ninety five percent (0.95%) of said first rate of divergence.

10. A joint as set forth in claim 2 wherein said second rate of divergence is greater than said first rate of divergence to bias said cage in said second direction.

11. A joint as set forth in claim 10 wherein said first rate of divergence is at least eighty percent (0.80%) of said second rate of divergence.

12. A joint as set forth in claim 11 wherein said first rate of divergence is at least ninety five percent (0.95%) of said second rate of divergence.

13. A joint as set forth in claim 1 wherein said inner member defines an aperture for receiving a driven shaft therein extending away from said attachment end.

14. A joint as set forth in claim 1 wherein said plurality of drive balls include a spherical shape.

15. A constant velocity joint comprising:

an outer member having an attachment end for attachment to a drive shaft and defining an interior and a plurality of outer member ball tracks within said interior extending along a longitudinal axis with said plurality of outer member ball tracks including a first group of outer member ball tracks and a second group of outer member ball tracks;

an inner member disposed within said interior and defining a plurality of inner member ball tracks extending along said longitudinal axis with said plurality of inner member ball tracks including a first group of inner member ball tracks and a second group of inner member ball tracks;

said first group of inner member ball tracks opposing said first group of outer member ball tracks to define a first group of funnels and said second group of inner member ball tracks opposing said second group of outer member ball tracks to define a second group of funnels, wherein said first group of funnels and said second group of funnels are arranged radially about said longitudinal axis in alternating relationship relative to each other;

a plurality of drive balls with one of said plurality of drive balls disposed within each of said first group of funnels and within each of said second group of funnels; and a cage disposed between said outer member and said inner member and defining a plurality of windows, each of said windows having a size, a shape and a spacing from adjacent windows, with one of said plurality of drive balls disposed within each of said plurality of windows, each of the plurality of windows having substantially the same size and shape and spacing from the adjacent windows;

said first group of inner member ball tracks and said first group of outer member ball tracks of said first group of funnels spaced from each other in non-parallel relationship to define a first diverging width that diverges toward said attachment end in a first direction along said longitudinal axis to urge said plurality of drive balls disposed within said first group of funnels in said first direction;

said second group of inner member ball tracks and said second group of outer member ball tracks of said second group of funnels spaced from each other in non-parallel relationship to define a second diverging width that diverges away from said attachment end in a second direction along said longitudinal axis to urge said plurality of drive balls disposed within said second group of funnels in said second direction;

said first diverging width increasing in value along said longitudinal axis in said first direction at a first rate of divergence and said second diverging width increasing in value along said longitudinal axis in said second direction at a second rate of divergence different from said first rate of divergence, a difference between the first rate of divergence and the second rate of divergence providing a net force from said drive balls to said cage to bias said cage in the direction that has the greater rate of divergence.

16. A constant velocity joint comprising:

an outer member having an attachment end for attachment to a drive shaft and defining an interior and a plurality of outer member ball tracks within said interior extending along a longitudinal axis with said plurality of outer member ball tracks including a first group of outer member ball tracks and a second group of outer member ball tracks;

an inner member disposed within said interior and defining a plurality of inner member ball tracks extending along said longitudinal axis with said plurality of inner member ball tracks including a first group of inner member ball tracks and a second group of inner member ball tracks;

said first group of inner member ball tracks opposing said first group of outer member ball tracks to define a first group of funnels and said second group of inner member ball tracks opposing said second group of outer member ball tracks to define a second group of funnels;

a plurality of drive balls with one of said plurality of drive balls disposed within each of said first group of funnels and within each of said second group of funnels; and a cage disposed between said outer member and said inner member and defining a plurality of windows, each of said windows having a size, a shape and a spacing from adjacent windows, with one of said plurality of drive balls disposed within each of said plurality of windows, each of the plurality of windows having substantially the same size and shape and spacing from the adjacent windows;

said first group of inner member ball tracks and said first group of outer member ball tracks of said first group of funnels spaced from each other in non-parallel relationship to define a first diverging width that diverges toward said attachment end in a first direction along said longitudinal axis to urge said plurality of drive balls disposed within said first group of funnels in said first direction;

said second group of inner member ball tracks and said second group of outer member ball tracks of said second group of funnels spaced from each other in non-parallel relationship to define a second diverging width that diverges away from said attachment end in a second direction along said longitudinal axis to urge said plurality of drive balls disposed within said second group of funnels in said second direction;

said first diverging width increasing in value along said longitudinal axis in said first direction at a first rate of divergence and said second diverging width increasing in value along said longitudinal axis in said second direction at a second rate of divergence different from said first rate of divergence, a difference between the first rate of divergence and the second rate of divergence providing a net force from said drive balls to said cage to bias said cage in the direction that has the greater rate of divergence.

\* \* \* \* \*